United States Patent
Coggio et al.

(10) Patent No.: US 9,465,145 B2
(45) Date of Patent: Oct. 11, 2016

(54) LOW REFRACTIVE INDEX DIFFUSER ELEMENT HAVING INTERCONNECTED VOIDS

(75) Inventors: William D. Coggio, Westford, MA (US); Michael L. Steiner, New Richmond, WI (US); Tao Liu, Woodbury, MN (US); Lan H. Liu, Rosemount, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 95 days.

(21) Appl. No.: 13/879,847

(22) PCT Filed: Oct. 14, 2011

(86) PCT No.: PCT/US2011/056255
§ 371 (c)(1),
(2), (4) Date: Apr. 17, 2013

(87) PCT Pub. No.: WO2012/054319
PCT Pub. Date: Apr. 26, 2012

(65) Prior Publication Data
US 2013/0208360 A1 Aug. 15, 2013

Related U.S. Application Data

(60) Provisional application No. 61/394,974, filed on Oct. 20, 2010.

(51) Int. Cl.
*G02B 5/02* (2006.01)
*G02B 1/11* (2015.01)

(52) U.S. Cl.
CPC .............. *G02B 5/0242* (2013.01); *G02B 1/11* (2013.01); *G02B 2207/107* (2013.01)

(58) Field of Classification Search
CPC .... G02B 5/0242; G02B 5/0247; G02B 1/11; G02B 5/02; G02B 2207/107; G02B 5/0236
USPC .......................................................... 359/599
See application file for complete search history.

(56) References Cited

U.S. PATENT DOCUMENTS 5,204,219 A 4/1993 VanOoij
5,264,275 A 11/1993 Misuda
(Continued)

FOREIGN PATENT DOCUMENTS

EP 193269 9/1986
EP 1167313 1/2002
(Continued)

OTHER PUBLICATIONS

Kuo et al., "Realization of a near-perfect antireflection coating for silicon solar energy utilization," Optics Letters, vol. 33, No. 21, Nov. 1, 2008.*

(Continued)

*Primary Examiner* — Stephone B Allen
*Assistant Examiner* — Adam W Booher
(74) *Attorney, Agent, or Firm* — Gregg H. Rosenblatt

(57) ABSTRACT

An optical diffuser layer includes a binder, a plurality of metal oxide particles dispersed in the binder, and a plurality of interconnected voids. A plurality of haze generating particles are dispersed in the binder. The optical diffuser layer has an effective refractive index of 1.3 or less.

18 Claims, 1 Drawing Sheet

(56) References Cited

U.S. PATENT DOCUMENTS

| | | | |
|---|---|---|---|
| 5,607,764 A * | 3/1997 | Konno et al. | 428/327 |
| 5,919,555 A | 7/1999 | Yasuda | |
| 6,096,469 A | 8/2000 | Anderson | |
| 6,239,907 B1 * | 5/2001 | Allen et al. | 359/443 |
| 6,268,961 B1 | 7/2001 | Nevitt | |
| 6,280,063 B1 | 8/2001 | Fong | |
| 6,602,596 B2 | 8/2003 | Kimura | |
| 6,710,923 B2 * | 3/2004 | Ito | 359/599 |
| 6,771,335 B2 | 8/2004 | Kimura | |
| 7,132,136 B2 * | 11/2006 | Laney et al. | 428/1.1 |
| 8,534,849 B2 | 9/2013 | Coggio | |
| 2004/0245854 A1 | 12/2004 | Hattori | |
| 2004/0253427 A1 * | 12/2004 | Yokogawa et al. | 428/212 |
| 2005/0068628 A1 | 3/2005 | Masaki | |
| 2006/0204655 A1 * | 9/2006 | Takahashi | 427/180 |
| 2006/0209404 A1 | 9/2006 | Kim | |
| 2007/0229804 A1 | 10/2007 | Inoue et al. | |
| 2007/0231510 A1 | 10/2007 | Baker | |
| 2010/0208349 A1 | 8/2010 | Beer | |
| 2012/0038990 A1 * | 2/2012 | Hao et al. | 359/599 |
| 2012/0200931 A1 | 8/2012 | Haag | |
| 2012/0201977 A1 | 8/2012 | Haag | |
| 2013/0202867 A1 | 8/2013 | Coggio | |
| 2013/0222911 A1 | 8/2013 | Coggio | |

FOREIGN PATENT DOCUMENTS

| | | | |
|---|---|---|---|
| EP | 1445095 | 8/2004 | |
| EP | 1591804 | 11/2005 | |
| JP | 2000075134 A * | 3/2000 | G02B 5/30 |
| JP | 2002-365403 | 12/2002 | |
| JP | 2005-352121 | 12/2005 | |
| JP | 2006-171596 | 6/2006 | |
| JP | 2006-251163 | 9/2006 | |
| JP | 2007-094369 | 4/2007 | |
| JP | 2008-081551 | 4/2008 | |
| JP | 2008-233776 | 10/2008 | |
| JP | 2010-082985 | 4/2010 | |
| JP | 2010-139933 | 6/2010 | |
| JP | 2010-224251 | 10/2010 | |
| JP | 2010-230816 | 10/2010 | |
| WO | 2007/146509 | 12/2007 | |
| WO | 2009/102951 A3 | 8/2009 | |

OTHER PUBLICATIONS

Malitson, "Interspecimen Comparison of the Refractive Index of Fused Silica," Journal of the Optical Society of America, vol. 55, No. 10, Oct. 1965.*

Malitson, "Refraction and Dispersion of Synthetic Sapphire," Journal of the Optical Society of America, vol. 52, No. 12, Dec. 1962.*

Mie, "Contributions on the optics of turbid media, particularly colloidal metal solutions," English translation by Sandia Laboratories, Jul. 1978, originally published in Annalen der Physik, Series IV, V, 25, 1908, p. 377-445.*

Paint Flow and Pigment Dispersion, Patton, T.C., $2^{nd}$ Edition, J. Wiley Interscience, 1978, Chapter 5, p. 126.

Modeling Cluster Voids and Pigment Distribution to Predict Properties and CPVC in Coatings. Part 1: Dry Coating Analysis and Sudduth, R. D. Pigment and Resin Technology, 2008, 37(6). p. 375.

Ridgeway, CJ, Transport in Porous Media, 2006, 63, p. 239.

Lee, H.K. et al, The Journal of Imaging Science and Technology, 2005, 49, p. 54.

Office Action in corresponding JP Application No. 2013-534965; dated Mar. 7, 2016, 2pgs.

EP Search Results for Application No. EP 11779015, mailed May 4, 2016, 3pgs.

* cited by examiner

LOW REFRACTIVE INDEX DIFFUSER ELEMENT HAVING INTERCONNECTED VOIDS

BACKGROUND

Articles having a structure of nanometer sized pores or voids can be useful for several applications based on optical, physical, or mechanical properties provided by their nanovoided composition. For example, a nanovoided article includes a polymeric solid network or matrix that at least partially surrounds pores or voids. The pores or voids are often filled with gas such as air. The dimensions of the pores or voids in a nanovoided article can generally be described as having an average effective diameter that can range from about 1 nanometer to about 1000 nanometers. The International Union of Pure and Applied Chemistry (IUPAC) has defined three size categories of nanoporous materials: micropores with voids less than 2 nm, mesopores with voids between 2 nm and 50 nm, and macropores with voids greater than 50 nm. Each of the different size categories can provide unique properties to a nanovoided article.

Several techniques have been used to create porous or voided articles, including, for example, polymerization-induced phase separation (PIPS), thermally-induced phase separation (TIPS), solvent-induced phase separation (SIPS), emulsion polymerization, and polymerization with foaming/blowing agents. Often, the porous or voided article produced by these methods requires a washing step to remove materials such as surfactants, oils, or chemical residues used to form the structure. The washing step can limit the size ranges and uniformity of the pores or voids produced. These techniques are also limited in the types of materials that can be used.

BRIEF SUMMARY

The present disclosure relates to low refractive index diffuser layers. In particular, the present disclosure relates to low refractive index diffuser layers that include haze generating particles dispersed in smaller porous particles.

In one illustrative embodiment an optical diffuser layer includes a binder, a plurality of metal oxide particles dispersed in the binder, a plurality of interconnected voids. A plurality of haze generating particles are dispersed in the binder. The optical diffuser layer has an effective refractive index of 1.3 or less.

In another illustrative embodiment an optical article includes an optical element and an optical diffuser layer disposed on the optical element. The optical diffuser layer includes a binder, a plurality of metal oxide particles dispersed in the binder, a plurality of interconnected voids, and a plurality of haze generating particles dispersed in the binder. The optical diffuser layer has an effective refractive index of 1.3 or less.

In a further illustrative embodiment an optical article includes an optical element and a low index layer disposed on the optical element and a second low index layer disposed on the optical element or on the low index layer. The low index layer includes a binder, a plurality of first metal oxide particles having a first average lateral dimension dispersed in the binder and a plurality of interconnected voids and a plurality of haze generating particles dispersed in the binder. The low index layer has an effective refractive index of 1.3 or less. The second low index layer includes a binder, a plurality of second metal oxide particles dispersed in the binder, and a plurality of interconnected voids. The second low index layer has an effective refractive index of 1.3 or less.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Figure 1:
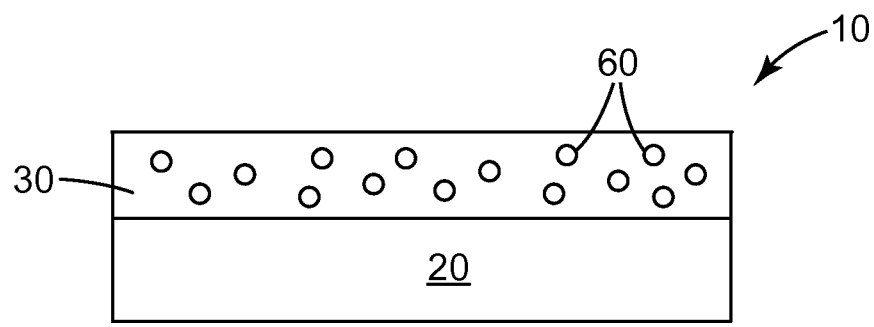
FIG. 1 is a schematic diagram side elevation view of an illustrative optical article.

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if a cell depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as begin "directly on," "directly connected to," "directly coupled with," or "directly in contact with" another element, there are no intervening elements, components or layers for example.

The present disclosure relates to low refractive index diffuser layers. In particular, the present disclosure relates to low refractive index diffuser layer that include haze generating particles dispersed in smaller porous particles. The present disclosure describes integrated optics in film format that can be useful for display applications. In particular, the present disclosure describes a low refractive index layer that is hazy and can function as a diffuser sheet. The present disclosure reduces the number of individual optical elements or films that are needed in a display application. While the present disclosure is not so limited, an appreciation of various aspects of the disclosure will be gained through a discussion of the examples provided below.

Some embodiments of the diffuser coatings, articles or constructions of the present disclosure include one or more low refractive index layers that include a plurality of voids dispersed in a binder. The voids have an index of refraction $n_v$ and a permittivity $\epsilon_v$, where $n_v^2 = \epsilon_v$, and the binder has an index of refraction $n_b$ and a permittivity $\epsilon_b$, where $n_b^2 = \epsilon_b$. In general, the interaction of a low refractive index layer with light, such as light that is incident on, or propagates in, the low refractive index layer, depends on a number of film or layer characteristics such as, for example, the film or layer thickness, the binder index, the void or pore index, the pore shape and size, the spatial distribution of the pores, and the wavelength of light. In some embodiments, light that is incident on or propagates within the low refractive index layer "sees" or "experiences" an effective permittivity $\epsilon_{eff}$ and an effective index $n_{eff}$, where $n_{eff}$ can be expressed in terms of the void index $n_v$, the binder index $n_b$, and the void porosity or volume fraction "f." In such embodiments, the low refractive index layer is sufficiently thick and the voids are sufficiently small so that light cannot resolve the shape and features of a single or isolated void. In such embodiments, the size of at least a majority of the voids, such as at least 60% or 70% or 80% or 90% of the voids, is not greater than about $\lambda/5$, or not greater than about $\lambda/6$, or not greater than about $\lambda/8$, or not greater than about $\lambda/10$, or not greater than about $\lambda/20$, where $\lambda$ is the wavelength of light. In some embodiments, some of the voids can be sufficiently small so that their primary optical effect is to reduce the effective index, while some other voids can reduce the effective index and scatter light, while still some other voids can be sufficiently large so that their primary optical effect is to scatter light.

In some embodiments, the light that is incident on an low refractive index layer is visible light, meaning that the wavelength of the light is in the visible range of the electromagnetic spectrum. In these embodiments, the visible light has a wavelength that is in a range of from about 380 nm to about 750 nm, or from about 400 nm to about 700 nm, or from about 420 nm to about 680 nm. In these embodiments, the low refractive index layer has an effective index of refraction and includes a plurality of voids if the size of at least a majority of the voids, such as at least 60% or 70% or 80% or 90% of the voids, is not greater than about 70 nm, or not greater than about 60 nm, or not greater than about 50 nm, or not greater than about 40 nm, or not greater than about 30 nm, or not greater than about 20 nm, or not greater than about 10 nm.

In some embodiments, the low refractive index layer is sufficiently thick so that the low refractive index layer has an effective index that can be expressed in terms of the indices of refraction of the voids and the binder, and the void or pore volume fraction or porosity. In such embodiments, the thickness of the low refractive index layer is not less than about 1 micrometer, or not less than about 2 micrometers, or in a range from 1 to 20 micrometers.

When the voids in a disclosed low refractive index layer are sufficiently small and the low refractive index layer is sufficiently thick, the low refractive index layer has an effective permittivity $\epsilon_{eff}$ that can be expressed as:

$$\epsilon_{eff} = f\epsilon_v + (1-f)\epsilon_b \quad (1)$$

In these embodiments, the effective index $n_{eff}$ of the low refractive index layer can be expressed as:

$$n_{eff}^2 = f n_v^2 + (1-f)n_b^2 \quad (2)$$

In some embodiments, such as when the difference between the indices of refraction of the pores and the binder is sufficiently small, the effective index of the low refractive index layer can be approximated by the following expression:

$$n_{eff} = f n_v + (1-f)n_b \quad (3)$$

In these embodiments, the effective index of the low refractive index layer is the volume weighted average of the indices of refraction of the voids and the binder. Under ambient conditions, the voids contain air, and thus the refractive index $n_v$ for the voids is approximately 1.00. For example, an optical film or low refractive index layer that has a void volume fraction of about 50% and a binder that has an index of refraction of about 1.5 has an effective index of about 1.25.

In some embodiments, the effective index of refraction of the low refractive index layer is not greater than (or is less than) about 1.3, or less than about 1.25, or less than about 1.2, or less than about 1.15, or less than about 1.1. In some embodiments, the refractive index is between about 1.14 and about 1.30. In some embodiments, the low refractive index layer includes a binder, a plurality of particles, and a plurality of interconnected voids or a network of interconnected voids. In other embodiments, the low refractive index layer includes a binder and a plurality of interconnected voids or a network of interconnected voids.

A plurality of interconnected voids or a network of interconnected voids can occur in a number of methods. In one process, the inherent porosity of highly structured, high surface area fumed metal oxides, such as fumed silica oxides, is exploited in a mixture of binder to form a composite structure that combines binder, particles, voids and optionally crosslinkers or other adjuvant materials. The desirable binder to particle ratio is dependent upon the type of process used to form the interconnected voided structure.

While a binder resin is not a prerequisite for the porous fumed silica structure to form, it is typically desirable to incorporate some type of polymeric resin or binder in with the metal oxide network to improve the processing, coating quality, adhesion and durability of the final construction. Examples of useful binder resins are those derived from thermosetting, thermoplastic and UV curable polymers. Examples include polyvinylalcohol, (PVA), polyvinylbutyral (PVB), polyvinyl pyrrolidone (PVP), polyethylene vinyl acetate copolymers (EVA), cellulose acetate butyrate (CAB) polyurethanes (PURs), polymethylmethacrylate (PMMA), polyacrylates, epoxies, silicones and fluoropolymers. The binders could be soluble in an appropriate solvent such as water, ethyl acetate, acetone, 2-butone, and the like, or they could be used as dispersions or emulsions. Examples of some commercially available binders useful in the mixtures are those available from Kuraray-USA, Wacker Chemical, Dyneon LLC, and Rhom and Haas. Although the binder can be a polymeric system, it can also be added as a polymerizable monomeric system, such as a UV, or thermally curable or crosslinkable system. Examples of such systems would be UV polymerizable acrylates, methacrylates, multi-functional acrylates, urethane-acrylates, and mixtures thereof. Some typical examples would be 1,6 hexane diol diacrylate, trimethylol propane triacrylate, pentaerythritol triacrylate. Such systems are readily available from suppliers such as Neo Res (Newark, Del.), Arkema (Philadelphia, Pa.), or Sartomer (Exton, Pa.). Actinic radiation such as electron beam (E-beam), gamma and UV radiation are useful methods to initiate the polymerization of these systems, with many embodiments utilizing UV active systems. Other useful binder systems can also be cationically polymerized, such systems are available as vinyl ethers and epoxides.

The polymeric binders can also be formulated with cross linkers that can chemically bond with the polymeric binder to form a crosslinked network. Although the formation of crosslinks is not a prerequisite for the formation of the porous structure or the low refractive index optical properties, it is often desirable for other functional reasons, such as to improve the cohesive strength of the coating, adhesion to the substrate or moisture or thermal and solvent resistance. The specific type of crosslinker is dependent upon the binder used. Typical crosslinkers for polymeric binders such as PVA would be diisocyanates, titantates such as TYZOR-LA™ (available from DuPont, Wilmington, Del.), poly(epichlorhydrin)amide adducts such as PolyCup 172, (available from Hercules, Wilmington, Del.), multi-functional aziridines such as CX100 (available from Neo-Res, Newark, Del.) and boric acid, diepoxides, diacids and the like.

The polymeric binders may form a separate phase with the particle aggregates or may be inter-dispersed between the particle aggregates in a manner to "bind" the aggregates together into a structures that connect with the metal oxidize particles through direct covalent bond formation or molecular interactions such as ionic, dipole, van Der Waals forces, hydrogen bonding and physical entanglements with the metal oxides.

Exemplary particles include fumed metal oxides or pyrogenic metal oxides, such as, for example, a fumed silica or alumina. In some embodiments, particles that are highly branched or structured may be used. Such particles prevent efficient packing in the binder matrix and allow interstitial voids or pores to form. Exemplary materials include highly branched or structured particles include Cabo-Sil™ fumed silicas or silica dispersions, such as, for example, those sold under trade designations EH5, TS 520, or pre-dispersed fumed silica particles such as those available as Cabo-Sperse™ PG 001, PG 002, PG 022, 1020K, 4012K, 1015A (available from Cabot Corporation Bellerica, Mass. and those available from Evonik-USA (Parsippany, N.J.) such as Aerodisp®W7622, Aerodisp®W7612S, Aerodisp®W7615S, and Aerodisp®W 630 Fumed alumina oxides are also useful structured particles to form a low refractive index system although silica may be preferred since it has an inherent by lower skeletal refractive index than alumina. Examples of alumina oxide are available under the trade name Cabo-Sperse, such as, for example, those sold under the trade designation Cabo-Sperse™ PG003 or Cabot Spec-Al™. In some embodiments, aggregates of these exemplary fumed metal oxides include a plurality of primary particles in the range of about 8 nm to about 20 nm and form a highly branched structure with a wide distribution of sizes ranging from about 80 nm to greater than 300 nm. In some embodiments, these aggregates pack randomly in a unit volume of a coating to form a mesoporous structure with complex bi-continuous network of channels, tunnels, and pores which entrap air in the network and thus lower the density and refractive index of the coating. Other useful porous materials are derived from naturally occurring inorganic materials such as clays, barium sulfates, alumina silicates and the like. The low refractive index layer has an effective refractive index of 1.23 or less when the metal oxide is silica oxide and 1.33 or less then the metal oxide is alumina oxide.

Fumed silica particles can also be treated with a surface treatment agent. Surface treatment of the metal oxide particles can provide, for example, improved dispersion in the polymeric binder, altered surface properties, enhanced particle-binder interactions, and/or reactivity. In some embodiments, the surface treatment stabilizes the particles so that the particles are well dispersed in the binder, resulting in a substantially more homogeneous composition. The incorporation of surface modified inorganic particles can be tailored, for example, to enhance covalent bonding of the particles to the binder, thereby providing a more durable and more homogeneous polymer/particle network.

The preferred type of treatment agent is determined, in part, by the chemical nature of the metal oxide surface. Silanes are preferred for silica and other siliceous fillers. In the case of silanes, it may be preferred to react the silanes with the particle surface before incorporation into the binder. The required amount of surface modifier is dependent upon several factors such as, for example, particle size, particle type, modifier molecular weight, and/or modifier type. The silane modifier can have reactive groups that form covalent bonds between particles and the binder, such as, for example, carboxy, alcohol, isocynanate, acryloxy, epoxy, thiol or amines. Conversely, the silane modifier can have non-reactive groups, such as, for example, alkyl, alkloxy, phenyl, phenyloxy, polyethers, or mixtures thereof. Such non-reactive groups may modify the surface of the coatings to improve, for example, soil and dirt resistance or to improve static dissipation. Commercially available examples of a surface modified silica particle include, for example, Cabo-Sil™ TS 720 and TS 530. It may sometimes be desirable to incorporate a mixture of functional and non-function groups on the surface of the particles to obtain a combination of these desirable features.

Representative embodiments of surface treatment agents suitable for use in the compositions of the present disclosure include, for example, N-(3-triethoxysilylpropyl)methoxyethoxyethoxyethyl carbamate, N-(3-triethoxysilylpropyl) methoxyethoxyethoxyethyl carbamate, 3-(methacryloyloxy) propyltrimethoxysilane, 3-acryloxypropyltrimethoxysilane, 3-(methacryloyloxy)propyltriethoxysilane, 3-(methacryloyloxy)propylmethyldimethoxysilane, 3-(acryloyloxypropyl) methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate (BCEA), 2-(2-methoxyethoxy)acetic acid, methoxyphenyl acetic acid, and mixtures thereof.

Particle volume concentration (PVC) and critical particle volume concentration (CPVC) can be used to characterize the porosity of the particle binder system used to make the coating. The terms PVC and CPVC are well defined terms in the paint and pigment literature and are further defined in frequently referenced articles and technical books, such as, for example *Paint Flow and Pigment Dispersion*, Patton, T. C., 2$^{nd}$ Edition, J. Wiley Intersceince, 1978, Chapter 5, p. 126 and *Modeling Cluster Voids and Pigment Distribution to Predict Properties and CPVC in Coatings. Part 1: Dry Coating Analysis* and Sudduth, R. D; *Pigment and Resin Technology*, 2008, 37(6). p. 375.

When the volume concentration of the particles is large than the CPVC, the coating is porous since there is not enough binder to fill all the gaps between the particles and the interstitial regions of the coating. The coating then becomes a mixture of binder, particles, and voids. The volume concentration at which this occurs is related to particle size and particle structure wetting, and/or shape. Formulations with volume concentrations above the CPVC have a volume deficiency of resin in the mixture that is replaced by air. The relationship between CPVC, PVC and porosity is:

$$\text{Porosity} = 1 - \frac{CPVC}{PVC}$$

Materials that provide desired low refractive index properties have submicron pores derived from particle-binder mixtures that are highly structured and formulated above their CPVC. In some embodiments, optical articles have CPVC values that are not greater than (or are less than) about 60%, or less than about 50%, or less than about 40%.

As described above, particles that are highly branched or structured prevent efficient packing in the binder matrix and allow interstitial voids or pores to form. In contrast, material combinations which fall below the desired CPVC will not be sufficiently porous. The BET method may be helpful in determining CPVC and thus porosity of low index materials because the BET method analyzes pores that are less than 200 nm in diameter, less than 100 nm in diameter, or even less than 10 nm in diameter. As used herein, the term "BET method" refers to the Braunauer, Emmett, and Teller surface area analysis (See S. Brunauer, P. H. Emmett and E. Teller, *J. Am. Chem. Soc.,* 1938, 60, 309). The BET method is a well-known, scientifically validated method used to determine pore size, surface area, and percent porosity of a solid substance. BET theory relates to the physical adsorption of gas molecules on a solid surface and serves as the basis for obtaining physical information about the surface area and porosity of a solid surface. BET data can assist in the characterization of materials that meet minimum requirements for forming a porous structure.

The volume concentration of the particles described by the PVC/CPVC relationship is also related to the weight concentration of the particles. It is therefore possible to establish particle weight ranges that are above the CPVC. The use of weight ratio or weight percent is one way to formulate mixtures with the desirable CPVC values. For the optical constructions of the present disclosure, weight ratios of binder to particle from 1:1 to 1:8 are desirable. A weight ratio of 1:1 is the equivalent of about 50 wt % particle, where as 1:8 is equivalent to about 89 wt % particle. Exemplary binder to metal oxide particle ratios are less than 1:2 (less than 33% binder), less than 1:3, less than 1:4, less than 1:5, less than 1:6, less than 1:7, less than 1:8, less than 1:9, and less than 1:10 (about 8-10% binder). The lower limit of binder may be dictated by the desired refractive index. The lower limit of binder may be dictated by the desired physical properties, for example, processing or final durability characteristics. Thus the binder to particle ratio will vary depending on the desired end use and the desired optical article properties.

In general, the low refractive index layer can have any porosity, pore-size distribution, or void volume fraction that may be desirable in an application. In some embodiments, the volume fraction of the plurality of the voids in the low refractive index layer is not less than about 20%, or not less than about 30%, or not less than about 40%, or not less than about 50%, or not less than about 60%, or not less than about 70%, or not less than about 80%.

In some embodiments, portions of the low refractive index layer can manifest some low index properties, even if the low refractive index layer has a high optical haze and/or diffuse reflectance. For example, in such embodiments, the portions of the low refractive index layer can support optical gain at angles that correspond to an index that is smaller than the index $n_b$ of the binder.

In some embodiments, some of the particles have reactive groups and others do not have reactive groups. For example in some embodiments, about 10% of the particles have reactive groups and about 90% of the particles do not have reactive groups, or about 15% of the particles have reactive groups and about 85% of the particles do not have reactive groups, or about 20% of the particles have reactive groups and about 80% of the particles do not have reactive groups, or about 25% of the particles have reactive groups and about 75% of the particles do not have reactive groups, or about 30% of the particles have reactive groups and about 60% of the particles do not have reactive groups, or about 35% of the particles have reactive groups and about 65% of the particles do not have reactive groups, or about 40% of the particles have reactive groups and about 60% of the particles do not have reactive groups, or about 45% of the particles have reactive groups and about 55% of the particles do not have reactive groups, or about 50% of the particles have reactive groups and about 50% of the particles do not have reactive groups. In some embodiments, some of the particles may be functionalized with both reactive and unreactive groups on the same particle.

The ensemble of particles may include a mixture of sizes, reactive and non-reactive particles and different types of particles, for example, organic particles including polymeric particles such as acrylics, polycarbonates, polystyrenes, silicones and the like; or inorganic particles such as glasses or ceramics including, for example, silica and zirconium oxide, and the like.

In some embodiments, the low refractive index layers or materials have a BET porosity that is greater than about 30% (which corresponds to a surface area of about 50 m$^2$/g as determined by the BET method), porosity greater than about 50% (which corresponds to a surface area of about 65-70 m$^2$/g as determined by the BET method), greater than about 60% (which corresponds to a surface area of about 80-90 m²/g as determined by the BET method), and most preferably between about 65% and about 80% (which corresponds to a somewhat higher surface area of values greater than about 100 m²/g as determined by the BET method). In some embodiments, the volume fraction of the plurality of interconnected voids in the low refractive index layer is not less than (or is greater than) about 20%, or greater than about 30%, or greater than about 40%, or greater than about 50%, or greater than about 60%, or greater than about 70%, or greater than about 90%. Generally it can be shown higher surface areas indicated higher percent porosity and thus lower refractive index, however, the relationship between these parameters is complicated. The values shown here are only for purposes of guidance and not meant to exemplify a limiting correlation between these properties. The BET surface area and percent porosity values will be dictated by the need to balance the low refractive index and other critical performance properties such as cohesive strength of the coating.

The optical constructions of the present disclosure can have any desired optical haze. In some embodiments, the low refractive index layer has an optical haze that is not less than (or is greater than) about 20%, or greater than about 30%, or greater than about 40%, or greater than about 50%, or greater than about 60%, or greater than about 70%, or greater than about 80%, or greater than about 90%, or greater than about 95%.

In some embodiments, portions of neighboring major surfaces of each two neighboring layers in optical construction are in physical contact with each other. For example, portions of neighboring major surfaces of respective neighboring layers in optical construction are in physical contact with each other. For example, at least 30%, or at least 40%, or at least 50%, or at least 60%, or at least 70%, or at least 80%, or at least 90%, or at least 95% of the two neighboring major surfaces are in physical contact with each other.

In some embodiments, portions of neighboring major surfaces (major surfaces that face each other or are adjacent to each other) of each two neighboring layers in optical construction are in physical contact with each other. For example, in some embodiments, there may be one or more additional layers, not expressly shown in the figures, disposed between low refractive index layer and optical elements. In such embodiments, substantial portions of neighboring major surfaces of each two neighboring layers in optical constructions are in physical contact with each other. In such embodiments, at least 30%, or at least 40%, or at least 50%, or at least 60%, or at least 70%, or at least 80%, or at least 90%, or at least 95% of the neighboring major surfaces of each two neighboring layers in the optical construction are in physical contact with each other.

There are numerous coating techniques known in the art useful to make the embodiments described herein. The more common techniques are, but not limited to, well known roll-to-roll automated processes such as knife bar, slot die, slide, curtain, roll and Grauvre coating techniques. It is also possible to coat these solutions using non-continuous methods such as inkjet, screen, offset printing, dip and spray coating techniques. While the exact coating technique is not critical to obtain the low refractive index properties some techniques enable multiple layers to be coated onto the substrate simultaneously and this improves the economics of the coating process. The desired final application will dictate which technique if preferred.

FIG. 1 is a schematic diagram side elevation view of an illustrative optical article 10. The optical article 10 includes an optical diffuser layer 30 that includes a binder, a plurality of metal oxide particles dispersed in the binder, and a plurality of interconnected voids. A plurality of haze generating particles 60 are dispersed in the binder. The optical diffuser layer 30 has an effective refractive index of 1.3 or less or 1.23 or less or 1.2 or less. The optical diffuser layer 30 can be disposed on an optical element 20 to form an optical article 10.

The haze generating particles 60 can be any useful particle such as polystyrene particles, for example. The haze generating particles 60 can have any useful diameter or average lateral dimension such as 0.5 to 5 micrometers or from 1 to 10 micrometers or 1 micrometer or greater, for example. In some embodiments, the plurality of haze generating particles 60 has an average lateral dimension in a range from 1 to 10 micrometers and the plurality of metal oxide particles has an average lateral dimension in a range of 500 nanometers or less.

The optical diffuser layer 30 can have any useful haze and clarity value. In many embodiments, the optical diffuser layer 30 has a haze value of at least 40%, or at least 60%, or at least 80%. In many embodiments, the optical diffuser layer 30 has a clarity value of at less than 50%, or less than 25%, or less than 15%. The optical diffuser layer 30 can have any useful thickness. In many embodiments, the optical diffuser layer 30 has a thickness in a range from 1 to 20 micrometers.

The optical element 20 can be any useful optical element. In some embodiments the optical element 20 is a polarizing film, a diffusing film, a reflecting film, a retarder, a light guide or a liquid crystal display panel. In some embodiments, the optical element 20 is a visible light transparent or transmissive substrate. In some embodiments, the optical element 20 can be an absorbing polarizer or a reflective polarizer. Reflective polarizers include fiber, multilayer, cholesteric, and wire grid reflective polarizers, for example. Multilayer reflective polarizers include Brightness Enhancement Film (BEF) and Dual Brightness Enhancement Film (DBEF) both commercially available from 3M Company, St. Paul, Minn. In some embodiments, the optical element 20 can be a light redirecting film and being diffractive and/or refractive. In some embodiments, the optical element 20 can be a graphic film, triacetate cellulose, or an optical adhesive.

Figure 2:
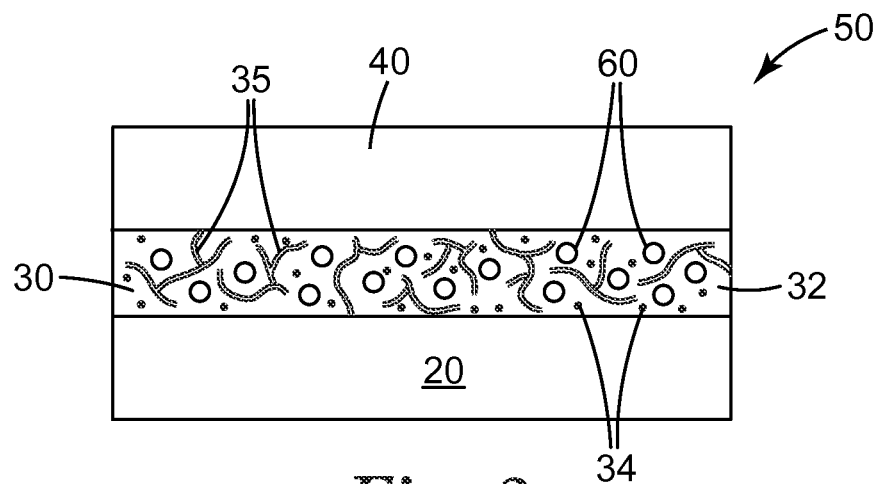
FIG. 2 is a schematic diagram side elevation view of another illustrative optical article The figures are not necessarily to scale. Like numbers used in the figures refer to like components. However, it will be understood that the use of a number to refer to a component in a given figure is not intended to limit the component in another figure labeled with the same number.

FIG. 2 is a schematic diagram side elevation view of another illustrative optical article 50. The optical article 50 includes an optical element 20 and a low index layer 30 disposed on the optical element 20 and a second low index layer 40 disposed on the optical element 20 or on the low index layer 30. While FIG. 2 illustrates the second low index layer 40 disposed on the low index layer 30 it is understood that the second low index layer 40 can be between the optical element 20 and the low index layer 30 or the optical element 20 can be between the two low index layers 30 and 40.

The low index layer 30 is described above and includes a binder 32, a plurality of first metal oxide particles 34 having a first average lateral dimension dispersed in the binder and a plurality of interconnected voids 35 and a plurality of haze generating particles 60 dispersed in the binder. The low index layer 30 has an effective refractive index of 1.3 or less. The second low index layer 40 includes a binder, a plurality of second metal oxide particles having a second average lateral dimension, being different than the first average lateral dimension, dispersed in the binder, and a plurality of interconnected voids. The second low index layer 40 has an effective refractive index of 1.3 or less. The optical article 50 can have an effective refractive index of 1.3 or less or 1.23 or less or 1.2 or less.

In some embodiments a first low index layer 30 has a high haze value (for example, at least 50% or at least 60% or at least 75% or at least 90%) and a second low index layer 40 a low index layer 30 disposed on the optical element 20 and a second low index layer 40 has a low haze (for example, less than 20% or less than 10%).

In some embodiments, an optical adhesive adheres the optical article 10, 50 to a second optical article (not shown). The second optical element can be any useful optical element. In some embodiments the second optical element is a polarizing film, a diffusing film, a reflecting film, a retarder, a light guide or a liquid crystal display panel. In some embodiments the second optical element is a visible light transparent substrate.

Examples

Comparative Examples CE-1 was prepared from mixtures of polyvinyl alcohol, Kuraray PVA-235 and fumed silica oxide dispersion Cab-O-Sperse™ 1020K. PVA is an 88% hydrolyzed, medium molecular weight polyvinyl alcohol available from Kuraray USA, Houston, Tex. Cab-O-Sperse™ 1020K, is a non-surface modified, alkaline stabilized dispersion of L90 fumed silica available from Cabot Corporation, Billerica, Mass. In a typical process, 138.8 g of 7.2 wt % PVA 235 solution in water was charged to a 800 ml plastic beaker (10.0 g PVA 235 on a dry weight basis) followed by the addition of 2.0 g of 10 wt % Tergitol™ Min-Foam 1× and 1 ml of concentrated $NH_4OH$ solution. Tergitol™ Min-Foam 1× is a non-ionic surfactant available from Dow Chemical of Midland, Mich. These components were mixed thoroughly with a stirring rod followed by the addition of 200 g of Cab-O-Sperse™ 1020K, 20 wt % fumed silica in water and an additional 162 g of deionized (DI) water. The components were mixed thoroughly using an air-driven mixer at low shear to reduce foaming. After mixing for about 5 minutes the contents were transferred to a 1 L, 1-neck round bottom flask and placed on a rotary evaporator system (available as a Rotovaptm from Buchi GmbH Flawil Switzerland) at 40° C. and 600 mm Hg vacuum to degas the mixture. The final mixture for CE-1 comprised on a dry weight basis 1 part PVA resin to 4 parts silica (1:4 PVA-Si ratio, 20% PVA by weight). The pH of the final solutions was typically between 9.2-10.2. The final solids were adjusted to between 9.5 and 10.5% wt.

Preparation of Low Index Diffuser Coating Solution Using Polystyrene Beads (EX-1).

The coating solution EX-1 was prepared by the addition of 9.6 g of Soken KSR 3 crosslinked polystyrene beads to 504 g of the 10% solids low index mixture prepared as described in CE-1 (1-4 PVA-Si 1020K). KSR 3A is available from Soken Chemical and Engineering Co. Ltd. Sayama-Shi, Saitama-Ken Japan. The KSR 3A beads were incorporated into the low index coating solution by use of an air driven mixer at low shear speeds to reduce foaming and air entrapment. The final mixture was transferred to a 1 L, 1-neck round bottom flask and placed on a Rotovap at 40° C. and 600 mm Hg vacuum to degas the mixture. The final solids of the ULI-diffuser coating mixture was 11.7% and consisted on a dry weight basis of 16.8 wt % PVA, 67.2 wt % 1020K Silica and 16 wt % KSR 3 polystyrene beads.

Preparation of Surface Modified Silica Particles with 50% A174 and 50% isooctyltrimethoxy Silane Used for Coating Solutions CE-2 and EX-2 and EX-3.

A 1000 ml 3-neck flask equipped with a stir bar, stir plate, condenser, heating mantle and temperature controller was charged with 400 grams of Cab-O-Sperse™ PG002 (Cabot Corporation, Boston, Mass.) 20 wt % solids fumed silica dispersion. To this dispersion, 50 grams of isopropanol was added with mixing. Next a premix of 6.15 grams 3-Methacryloxypropyltrimethoxysilane A174 (available as Stock #A17714 from Alfa Aesar, Ward Hill, Mass.), 5.80 grams isooctyltrimethoxysilane (Stock #SII6458.0, Gelest, Inc., Morrisville, Pa.) and 50 grams of isopropanol was added with mixing. The premix beaker was rinsed with aliquots of isopropanol totaling 50 grams. The rinses were added to the batch. The resultant mixture was a hazy, translucent dispersion. The batch was heated to 50 deg C. and held for approximately thirty minutes. After thirty minutes at 50 degrees C. the mixture was a homogeneous, opaque white dispersion. At this point, 250 grams of isopropanol was added to the batch. The batch was heated to reflux (~80 deg C.) and held with mixing. After approximately thirty minutes the batch became very viscous. An additional 200 grams of isopropanol was added. The batch became much less viscous. The batch was held at reflux for a total of six hours. After six hours at reflux, the batch was allowed to cool to room temperature with mixing. At this point the batch was a thick, off-white slurry with some dried solids on the walls of the reaction flask. The resultant reaction mixture was solvent exchanged into 1-methoxy-2-propanol by alternate vacuum distillation and addition of 1200 grams of 1-methoxy-2-propanol. The batch was concentrated further by vacuum distillation. The final mixture was a high viscosity, translucent dispersion with 15.4 wt % solids.

Coating Solution CE-2 was prepared at a 1-4 resin to silica weight ratio using the surface modified PG 002 silica described above and the UV curable urethane acrylate oligomer CN 9013, available from Sartomer USA of Exton, Pa. In an appropriately sized mix vessel, 50 g of modified PG 002 (15.4% solids, 7.7 g solids) was mixed with 1.28 g of CN 9013. 0.18 g of the photo initiator Irgacure 184 (available from Ciba USA, W. Paterson, N.J.) was added and the final mixture was diluted with an additional 12.5 g of 2-butanone to yield a coating solution with 14.4% solids.

Coating solutions EX-2 and EX-3 were prepared by mixing 100 g of the coating solution CE-3 with silica powder matting agent EXP-3600 (available from Evoniks USA, Hopewell, Va.). The matting agent was dispersed by the addition of the powder to the coating solution CE-3, followed by 2-butanone to adjust the final solids to 14%. The mixtures contained on a dry weight basis 30 wt % silica or 50 wt % silica matting agent EXP 3600 for EX-2 and EX-3 respectively.

Preparation of Low Index Diffuser Coating Solutions with Polystyrene Beads Used to Prepare CE-3, EX-4-5).

The coating solutions CE-3, EX-4-5 were prepared using a 1-6 by weight mixture of PVA to PG003 (fumed alumina, available from Cabot Corp). The diffuser beads were added at 0%, 50% and 70 wt % respectively to form the low index diffuser coatings CE-3, EX-4-5. In these coatings the beads used were Soken SX 350H, which are a 3 μm crosslinked polystyrene beads with a narrower size distribution than specified for KSR-3A. The bead dispersion was improved by the use of a standard laboratory Ross Mixer such as PreMax™ single stage roto-stator mixer operating at 4000 rpms for 5 minutes. Available from Charles Ross & Son Company Hauppauge, N.Y.

Preparation of PVA-$Al_2O_3$ Pre-Mix-A:

In a typical process, a 4 L plastic beaker equipped with an air driven mixer was charged with 538 g of PG003 (215 g of $Al_2O_3$), 25 g of 10% Tergitol™ Min-Foam 1× surfactant and 542 g of PVA 235 (6.6% solids, 35.8 g). The mixture was agitated at low speed to homogenized all the components. After a few minutes 1405 g of DI water was added and slowly mixed to produce Pre-Mix A comprising 1-6 PVA-Al$_2$O$_3$ at 10% solids. This coating solution was used to make comparative example CE-3.

Preparation of Diffuser Bead Pre-Mix-B:

In a separate 2 L plastic beaker equipped as before, 1440 g of water, 16 g 10% Tergitol™ Min-Foam 1× surfactant and 160 g of SX-350H polystyrene beads were mixed to form a homogenous 10 wt % dispersions of Pre-Mix B.

Coating solution EX-4 was prepared by mixing 250 g of Pre-Mix A and 250 g of Pre-Mix B followed by the high shear dispersion process to enhance the bead dispersion. This produce a mixture which contained 50 wt % SX-350H diffuser beads.

Coating solution EX-5 was prepared by mixing 150 g of Pre-Mix A and 350 g of Pre-Mix B followed by a high shear dispersion process to enhance the bead dispersion. This produced a mixture which contained 70 wt % SX-350H diffuser beads.

Coating Process:

All coatings were prepared using 50 micron primed PET film (DuPont—Teijin 689). Small laboratory scale hand spread coatings of good optical quality were prepared by coating the low index coating solution on primed polyester film. The film was held flat by use of a level 14×11 in. (35.6 cm×27.9 cm) vacuum table model 4900 available from Elcometer Inc. of Rochester Hills, Mich. The coating solution was spread evenly on PET using a wire round coating rods (Meyer rods) available from RD Specialties of Webster NY or by use of a knife bar available from Elcometer Inc (Rochester Hills, Mich.). In a typical procedure, a standard sheet of white paper (8.5×11 in) was placed between the vacuum table and optical film to prevent coating defects associated with the vacuum table. All coatings were made using a degassed solution to avoid optical defects such as air bubble and surface cracks. A 5-8 ml sample of the coating solution was placed near the top of the film and the coating was made using either a number 45 or 30 Meyer Rod which provided a coating with a nominal wet thickness of 114-76.2 um (4.5 or 3.0 mils) respectively. When a knife bar coater was used, a 50.8-101.6 microns (2 to 4 mil) knife bar gap provided a coating with a nominal wet thickness of 25.4 and 50.8 microns (1 to 2 mils) respectively. The wet coatings were allowed to air dry at room temp for about 2-3 minutes and were then carefully transferred to a flat glass plate and placed in a forced air oven at 50° C. to dry completely. The coatings were covered with an appropriately sized aluminum pan to reduce drying patterns on the film due to air movement in the oven.

Coatings based on CE-2, EX-2 and EX-3 based on a UV curable urethane acrylate resin and were coated using a #30 Meyer rod to yield a wet coating thickness of approximately 3 mils (76 microns). The wet coating was dried briefly at room temperature followed by complete drying at 100° C. for 2 minutes. The coatings were cured using 500 W Fusion Systems Light Hammer UV chamber flushed with dry N2 at a line speed of 20 fpm. The coating was exposed to H-bulb high intensity radiation.

Preparation of Surface Modified "Fumed" Silica for Coating Formulations CE-4 and EX-6

(1) Preparation of A-174 Modified Cabo-Sperse™ 1020K

A 3000 ml 3-neck flask equipped with a stir bar, stir plate, condenser, heating mantle and thermocouple/temperature controller was charged with 1000 g of Cab-O-Sperse 1020K (a 20 wt % solids dispersion of fumed silica, Cabot Corp.) To this dispersion, 1400 g of 1-methoxy-2-propanol was added with stirring. Next 30.75 g of 97% 3-(Methacryloxypropyl)trimethoxysilane (A-174, available from Alfa) was added to a 100 g poly beaker. The 3-(Methacryloxypropyl) trimethoxysilane was added to the batch with stirring. The beaker containing the 3-(Methacryloxypropyl)trimethoxysilane was rinsed with aliquots of 1-methoxy-2-propanol totaling 100 grams. The rinses were added to the batch. At this point the batch was an opaque white, viscous dispersion. The batch was heated to 80 deg C. and held for approximately 16 hours. The resulting mixture was viscous, opaque white slurry. The batch was cooled to room temperature. The water was removed from the batch by alternate vacuum distillation and addition of 900 g 1-methoxy-2-propanol. The batch was concentrated by vacuum distillation to result in a very viscosity, opaque dispersion with 31.1 wt % solids.

Preparation of Low Index Coating Solutions Used to Produce CE-4 and EX-6:

Coating solution CE-4 was made by dissolving 3.0 g of CN9893 (Sartomer, Exton, Pa.) in 7 g of ethyl acetate under ultrasonic treatment first, then 38.6 g (31.1% solids, 12 g solids) of A-174 modified Cabo-Sperse™ 1020K as prepared above, and 0.23 g of Irgacure 184 were mixed together to form a homogenous coating solution with a 1-4 resin to particle weight ratio.

Coating solution EX-6 was made by dissolving 7.4 g of the UV curable urethane acrylate CN9893 (Sartomer, Exton, Pa.) in 17.4 g of ethyl acetate under ultrasonic treatment first, then 95.8 g of A-174 modified Cabo-Sperse™ 1020K as prepared above (31.1% solids, 29.8 g), 7.4 g of Syloid® RAD 2105, (WR Grace Inc. of Columbia, Md.), 2.46 g of Tego®RAD 2250, (Silicone acrylate, Evoniks USA Hopewell, Va.) and 0.65 g of Irgacure 184 were mixed together under 4 hour constant stirring to form a homogenous solution with a 1-4 CN9893-particle ratio and with ~17 wt % diffuser particle content.

Coatings made from solutions CE-4 and EX-6 were prepared using UV curable resins mixture. These films were dried in an oven at 85° C. for 2 min and then cured using a Fusion UV-Systems Inc. Light-Hammer 6 UV (Gaithersburg, Md.) processor equipped with an H-bulb, operating under nitrogen atmosphere at 100% lamp power at a line speed of 30 feet/min (1 pass).

Optical Testing:

The summary of the examples is shown in Table 1. T-H-C refers to transmission (T), haze (H) and clarity (C). RI is refractive index. Refractive index (RI) values were determined by use of the prism coupling method using the Metricon 2010M Prism Coupler available from Metricon Corp. of Pennington, N.J. The RI (n) was determined at 633 nm. Accurate determination of the refractive index of the higher haze coatings was best determined by measuring the refractive index in the TM polarization state through the PET side of the coated film. In this process, the prism and the PET side of the coatings were coupled and the RI measurement was scanned between n=1.55 to 1.05. This method results in the detection of two critical angle transitions; one associated with the PET-prism interface at n=~1.495 and another associated with the PET-low index coating interface. The Metricon raw data were analyzed to determine the critical angle of this second transition by use of a 200 point smoothing analysis program of the regions above and below the inflection point of this second critical angle. Two linear regions were determined from the smoothed data and the intersection of these two lines corresponded to the inflection point of the curve and thus the RI of low refractive index coating.

Coated Article Optics:

Transmission, haze and clarity values were determined using a BYK-Gardner Haze Gard Plus (available from BYK-Gardner USA of Columbia, Md.). The reported values represent the average of at least 3 measurements taken from different regions of the coated film. The clarity value calculation uses the ratio $(T_2-T_1)/(T_1+T_2)$, where $T_1$ is the transmitted light that deviates from the normal direction between 1.6 and 2 degrees, and $T_2$ is the transmitted light that lies between zero and 0.7 degrees from the normal direction.

The data in this Table show the low index diffuser coatings can form optical constructions

| Sample # | Construction Type on PET | Diffuser Beads | Approximate Wet Coating thickness (mils) | T-H-C values | RI PET Film side |
|---|---|---|---|---|---|
| CE-1 | 1-4 PVA-Si 1020K | None | 3 | 66-99-86 | 1.178 |
| EX-1 | 1-4 PVA-Si 1020K + KSR 3 Beads | 16 wt % KSR 3 Polystyrene | 3 | 52-100-20 | 1.179 |
| CE-2 | 1-4 PUA-Surface modified PG002 | None | 3 | 88-35-87 | 1.18 |
| EX-2 | 1-4 PUA Surface modified PG002 | 30% Si Matting agent EXP-3600 | 3 | 83-85 56 | 1.16 |
| EX-3 | 1-4 PUA Surface modified PG002 | 50% Si Matting agent EXP-3600 | 3 | 79-99-32 | 1.16 |
| CE-3 | 1-6 PVA-$Al_2O_3$ | None | 4 | 81-40-100 | 1.273 |
| EX-4 | 1-6 PVA-$Al_2O_3$ | 50 wt % SX-350H | 4 | 81-98-36 | 1.329 |
| EX-5 | 1-6 PVA-$Al_2O_3$ | 70 wt % SX-350H | 4 | 79-99-17 | 1.326 |
| CE-4 | 1-4 PUA surface modified 1020K | None | 2.6 | 71-77-66 | 1.236 |
| EX-6 | 1-4 PUA surface modified 1020K | 17% Syloid RAD 2105 | 2.6 | 59-100-4 | 1.237 | which possess both high haze and low refractive index properties.

Preparation of Bilayer Diffuse Low Index Construction.

Bilayer diffuser low index constructions were prepared using a sequential coating process. The first layer consisted of low haze, low index layer coated on PET to form an input substrate S1 for over coating with the second low index diffuser layer. The substrate S1 was prepared by coating a low haze, low refractive index coating solution on a PET film. This solution was prepared from a mixture of polyvinyl alcohol (PVA) and fumed silica oxide Cab-O-Sperse™ PG022. In a typical procedure, 5000.0 g of Cab-O-Sperse™ PG 022 dispersion (20 wt % solids) was added to a 20 L plastic container equipped with an air driven laboratory mixer and a heating mantle. The silica dispersion was gently agitated and warmed to 45-50° C. When the dispersion had equilibrated in this temperature range, 90 g of a pre-warmed 5 wt % aqueous boric acid solution (available from Sigma-Aldrich of Milwaukee, Wis., corresponding to 35 g boric acid or 0.035 g boric acid/g silica) was added to the silica dispersion and was mixed for about 30 min. After this time, 100 g of a low foaming surfactant (10 wt % Tergitol™ Min-Foam 1× in water, available from Dow Chemical Midland, Mich.) was added to the silica-boric acid mixture followed by the addition of 168 g of polyvinyl alcohol. The PVA was added as 2315 g of an aqueous 7.2 wt % solution. Upon addition of the PVA, the mixture became very viscous and an additional 4350 g of DI water added to reduce the viscosity and ensure adequate mixing. The mixture was agitated under mild conditions for an additional 20 minutes. After this time, the coating solution was transferred to a 30 L, pressure pot container equipped with an air driven agitator and a vacuum system to and degassed at approximately 600-700 mm Hg for 30-45 min. After the mixture was degassed, the solids were checked and the mixture was found to contain 10.2% solids. The final mixture comprised 1 part PVA resin to 6 parts silica on a dry weight basis (1:6 PVA-Si ratio, 14.3% PVA by weight).

Coating Process:

The low index coating solution described above was coated on 50 micron (2 mil) Dupont—Teijin 689 primed PET film using an automated knife over roll coating process to produce the low refractive index coated PET substrate S1. The knife was 25.4 cm (10 in) wide and the coating solution was supplied to the coating reservoir via a peristaltic pump. The coating solution was degassed and passed through a 20 micron nominal filter with a hydrophilic filtration media available from Meisner Filtration Products of Camarillo, Calif. The coating solution was delivered warm to the solution bank while the knife and back-up roll were also heated to 38-42° C. (100.4 to 107.6° F.) to prevent solution gelling. The knife coating gap ranged from 101.2 microns (4 mils). The line speed was 4.57 m/min (15 fpm). Films were dried in a two zone convection oven with the first zone set at 46.1° C. (115° F.) and the second at 79.4° C. (175° F.). The dried coating was approximately 7-8 microns thick, as determined by a digital micrometer. The refractive index was measured to be 1.164 and the film had transmission-haze-clarity (T-H-C) values of 92%, 4% and 100% respectively.

The coated PET Film S1 was over coated using essentially the same coating solution as EX-1, (1-4 PVA-Si+KSR 3A beads) except the final percent solids of the coating solutions was 14.4%. The second overcoat was applied using the hand spread coating technique described previously. The coatings are described further in Table #2.

TABLE #2

| Sample | Substrate | Wet Coating Thickness (mils) | Coating Sequence | T-H-C | RI |
|---|---|---|---|---|---|
| S-1 | PET | 4 mil | N/A | 92-4-100 | 1.16 |
| EX-7 | S-1 | 8 mil | EX-1 on S-1 | 38-96-24 | 1.16 |
| EX-8 | S-1 | 4 mil | EX-1 on S-1 | 55-95-60 | 1.16 |
| EX-9 | S-1 | 4 mil | PET between S1 and EX-1 | 50-100-9 | 1.16 |

The data in Table #2 show the low index diffuser solution can be coated on a different low index layer to produce a bilayer construction with high haze, lower clarity and low refractive index.

Thus, embodiments of the LOW REFRACTIVE INDEX DIFFUSER ELEMENT are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present disclosure is limited only by the claims that follow.

What is claimed is:

1. An optical diffuser layer comprising:
a binder;
a plurality of fumed silica particles dispersed in the binder;
a plurality of interconnected voids; and
a plurality of haze generating particles dispersed in the binder, and
wherein the optical diffuser layer has an effective refractive index of 1.3 or less, and wherein the weight ratio of binder to fumed silica particles is 1:3 or less, wherein the optical diffuser layer has an optical haze of at least 40%.

2. An optical diffuser layer according to claim 1, further comprising alumina oxide particles.

3. An optical diffuser layer according to claim 1, wherein the haze generating particles have an average lateral dimension of 1 micrometer or greater.

4. An optical diffuser layer according to claim 1, wherein a volume fraction of the plurality of interconnected voids in the optical diffuser layer is not less than 50%.

5. An optical diffuser layer according to claim 1, wherein aggregates of the plurality of fumed silica particles include a plurality of primary particles in the range of about 8 nm to about 20 nm.

6. An optical diffuser layer according to claim 1, wherein the plurality of haze generating particles have an average lateral dimension in a range from 1 micrometer to 10 micrometers.

7. An optical diffuser layer according to claim 1, wherein the plurality of haze generating particles has an average lateral dimension in a range from 1 micrometer to 10 micrometers and the plurality of fumed silica particles has an average lateral dimension of 500 nanometers or less.

8. An optical diffuser layer according to claim 1, wherein the optical diffuser layer has an optical clarity of less than 60%.

9. An optical diffuser layer according to claim 1, wherein the optical diffuser layer has an optical clarity of less than 15%.

10. An optical article comprising:
an optical element; and
an optical diffuser layer disposed on the optical element, the optical diffuser layer comprising:
a binder;
a plurality of fumed silica particles dispersed in the binder;
a plurality of interconnected voids; and
a plurality of haze generating particles dispersed in the binder, and
wherein the optical diffuser layer has an effective refractive index of 1.3 or less, and
wherein the weight ratio of binder to fumed silica particles is 1:3 or less, wherein the optical diffuser layer has an optical haze of at least 40%.

11. An optical article according to claim 10, wherein the plurality of haze generating particles have an average lateral dimension of 1 micrometer or greater.

12. An optical article according to claim 10, wherein a volume fraction of the plurality of interconnected voids in the optical diffuser layer is not less than 50%.

13. An optical article according to claim 10, further comprising a low refractive index layer disposed on the optical element, wherein the optical element separates the optical diffuser layer and the low refractive index layer, wherein the low refractive index layer has an effective refractive index of 1.2 or less.

14. An optical article according to claim 10, further comprising a low refractive index layer disposed on the optical diffuser layer, wherein the optical diffuser layer separates the low refractive index layer and the optical element, wherein the low refractive index layer has an effective refractive index of 1.2 or less.

15. An optical article comprising:
an optical element; and
a first low index layer disposed on the optical element, the first low index layer comprising:
a binder;
a plurality of first fumed silica particles having a first average lateral dimension dispersed in the binder;
a plurality of interconnected voids; and
a plurality of haze generating particles dispersed in the binder, and
wherein the first low index layer has an effective refractive index of 1.3 or less; and a second low index layer disposed on the optical element or on the first low index layer;
the second low index layer comprising:
a binder;
a plurality of second fumed silica particles dispersed in the binder; and
a plurality of interconnected voids;
wherein the second low index layer has an effective refractive index of 1.3 or less, wherein the weight ratio of binder to fumed silica particles is 1:3 or less, and wherein the first low index layer has an optical haze of at least 60% and the second low index layer has an optical haze of less than 20%.

16. An optical article according to claim 15, wherein the optical article has an effective refractive index of 1.23 or less.

17. An optical article according to claim 15, wherein the second low index layer is disposed on the optical element and the optical element separates the first low index layer from the second low index layer.

18. An optical article according to claim 15, wherein the second low index layer is disposed on the first low index layer and the first low index layer separates the second low index layer from the optical element.

\* \* \* \* \*

UNITED STATES PATENT AND TRADEMARK OFFICE
CERTIFICATE OF CORRECTION

| | | |
|---|---|---|
| PATENT NO. | : 9,465,145 B2 | Page 1 of 1 |
| APPLICATION NO. | : 13/879847 | |
| DATED | : October 11, 2016 | |
| INVENTOR(S) | : Coggio et al. | |

It is certified that error appears in the above-identified patent and that said Letters Patent is hereby corrected as shown below:

In the Specification

Column 5,
Line 13, delete "triacryalalate" and insert -- triacrylate -- therefor.

Column 6,
Line 38, delete "isocynanate" and insert -- isocyanate -- therefor.

Column 7,
Line 17, delete "Intersceince" and insert -- Interscience -- therefor.

Column 9,
Line 56, delete "Grauvre" and insert -- Gravure -- therefor.

Signed and Sealed this
Twenty-fifth Day of April, 2017

Michelle K. Lee
*Director of the United States Patent and Trademark Office*